United States Patent [19]
Smallwood

[11] 3,736,950
[45] June 5, 1973

[54] ANTI-CONTAMINATION VENT VALVE

[75] Inventor: Donald L. Smallwood, Fort Mitchell, Ky.

[73] Assignee: Dover Corporation, New York, N.Y.

[22] Filed: July 12, 1971

[21] Appl. No.: 161,618

[52] U.S. Cl. ............... 137/202, 137/433, 137/454.5
[51] Int. Cl. ............................................. F16k 1/14
[58] Field of Search ............... 137/202, 433, 454.5, 137/519.5, 533.19, 363

[56] References Cited
UNITED STATES PATENTS

| | | | |
|---|---|---|---|
| 3,247,862 | 4/1966 | Burke | 137/454.5 X |
| 3,367,362 | 2/1968 | Hoffman | 137/519.5 X |
| 3,236,493 | 2/1966 | Richards | 137/202 X |
| 3,450,206 | 6/1969 | Watkins | 137/519.5 X |
| 2,049,340 | 7/1936 | Van Der Horst et al. | 137/433 X |

FOREIGN PATENTS OR APPLICATIONS 3,875 11/1896 Great Britain ........................ 137/202

Primary Examiner—Alan Cohan
Assistant Examiner—Gerald A. Michalsky
Attorney—J. Warren Kinney, Jr. and John G. Schenk

[57] ABSTRACT

An anti-contamination vent valve for preventing fluid escape to a vent line is disclosed. The valve provides for the venting of fumes from an enclosure to a vent line under normal conditions. The valve provides a closure member for preventing excess fluid from the enclosure escaping into the vent line and thereby contaminating the vent line or other enclosures which may be connected with the common vent line.

4 Claims, 3 Drawing Figures

PATENTED JUN 5 1973 3,736,950
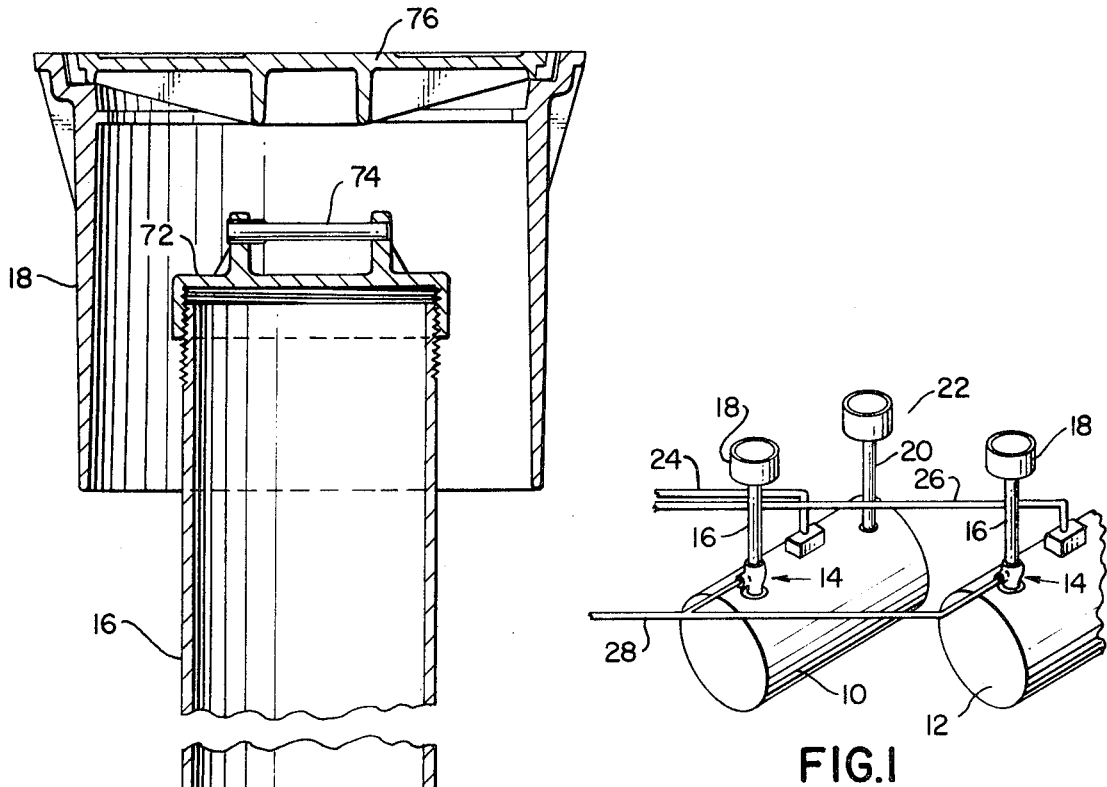
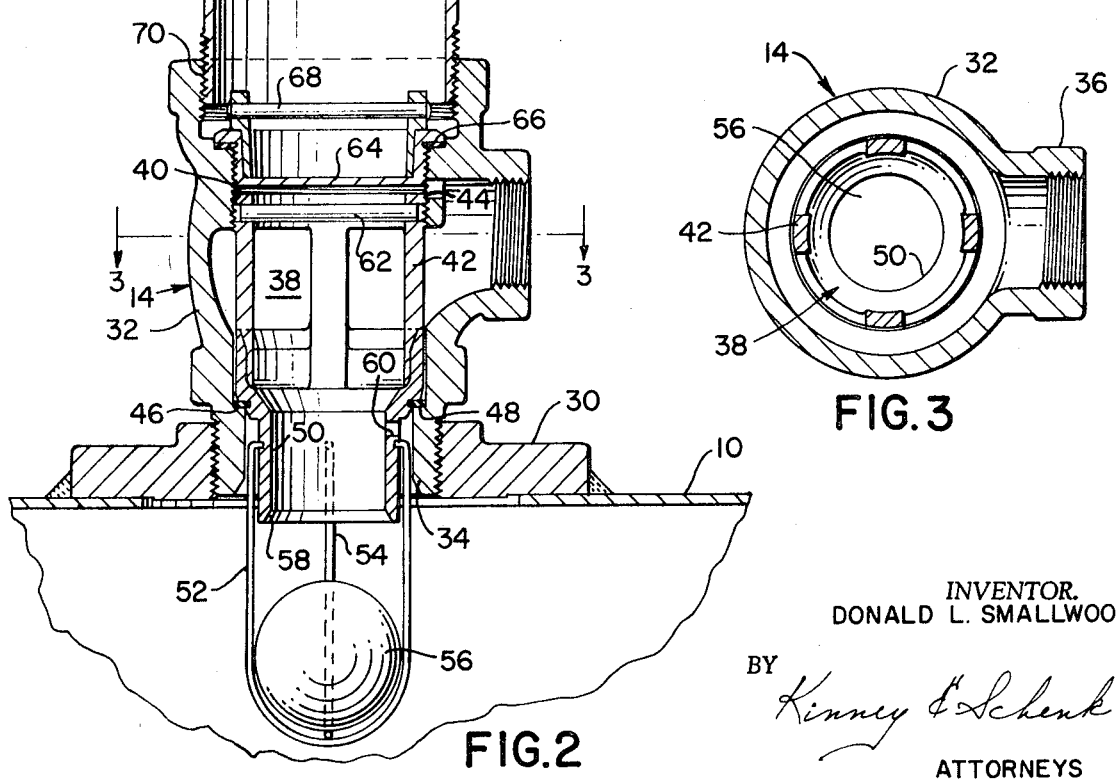
INVENTOR.
DONALD L. SMALLWOOD
BY Kinney & Schenk
ATTORNEYS

ANTI-CONTAMINATION VENT VALVE

BACKGROUND OF THE INVENTION

This invention relates generally to valves and more particularly to a normally open valve permitting vapor flow therethrough and closing to prevent flow therethrough in the presence of a fluid at the inlet side.

In many instances, it is desirable to have a valve which is normally in the open position to permit the passage therethrough of a vapor while preventing passage of a fluid therethrough. One example of when such a valve is needed is the use in underground storage tanks for such volatile materials as gasoline and the like. Many times, a plurality of such tanks are buried underground side by side. Heretofore, each tank had its own separate vent. Recently, it has become practical to provide a common vent line for all the underground tanks. A common vent is indispensible when one wishes to utilize a vapor recovery system in conjunction with the filling of the tanks. In a multiple tank arrangement with a common vent, it is very important that the fluid or gasoline from one tank not escape through the vent line and thereby contaminate another tank alongside thereof. At the present time, there is no economical and foolproof valve for use in such environments. The valves which are available are inherently complex with quite frequently multiple moving parts and are quite expensive.

Accordingly, it is an object of this invention to provide an anti-contamination vent valve which normally allows the passage of vapors or fumes therethrough.

A further object of this invention is to provide an anti-contamination vent valve which closes to prevent passage of fluids therethrough in the presence of an excessive amount of fluid in an enclosed container.

A still further object of this invention is to provide an anti-contamination valve which has few moving parts yet is foolproof in operation.

SUMMARY OF THE INVENTION

This invention provides an anti-contamination vent valve for preventing fluid escape from an enclosed container while allowing the container to vent fumes therefrom. The vent valve is of simple and economical construction, is foolproof in operation, and is easily replaceable from the valve housing. The vent valve assembly comprises open cage member having means supporting a float. The float cooperates with the cage member for opening and closing the vent valve depending on the fluid level in the fluid container. Means are provided to permit the container to bleed off fumes even when the vent valve is in the closed position.

Other details, uses, and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention in which:

FIG. 1 is a perspective view illustrating the exemplary embodiment of this invention showing the typical use of this vent valve in underground storage environments of a plurality of storage tanks;

FIG. 2 is a cross-sectional view of the anti-contamination vent valve of this invention; and FIG. 3 is a sectional view taken on the line 3—3 of FIG. 2.

DESCRIPTION OF ILLUSTRATED EMBODIMENT

Reference is now made to FIG. 1 which illustrates a typical underground storage area in which tanks 10 and 12 contain any fluid such as gasoline or the like from which fumes must be vented. The vent valve of this invention, designated generally by the reference numeral 14, is attached to the storage tank 10 and 12 by any conventional means. Each vent valve 14 is connected to a pipe 16 which extends upward to just below the ground surface level and terminates within a manhole 18. The manhole 18 is generally imbedded in the paving surface at ground level.

For purposes of explanation only in the illustrated example herein presented, it shall be assumed that the storage tanks 10 and 12 contain gasoline of different qualities, i.e., one tank contains a leaded gasoline and the other tank contains a non-leaded gasoline. Each tank is filled from ground level through a fill pipe 20. The fill pipe 20 is accessible through a manhole 22. Each tank is connected to the gasoline pumps respectively through conduits 24 and 26. Since the gasoline in the tanks is a volatile fluid, the fumes must be vented therefrom from a safety standpoint. Each vent valve 14 is connected to a common vent line 28 by any suitable means as described herebelow. The vent line 28 is vented to atmosphere in any suitable and acceptable manner. From the arrangement shown in FIG. 1, it can be readily seen that the vent valve 14 must allow the gasoline vapors to vent from each tank, yet must prevent the gasoline from either tank from entering the vent line 28 which could cause a contamination of the other storage tank and could provide a hazardous situation should the gasoline exit from the vent line 28.

Referring now to FIG. 2, the vent valve 14 is seen to be threadably mounted in a nut or the like member 30 which is welded to the storage tank 10. The vent valve 14 comprises an outer casing or housing 32 having an inlet end 34 and an outlet end 36. The outlet end 36 may be threaded so as to engage the vent line 28. The housing 32 defines an inner flow chamber 38 between the inlet 34 and outlet 36. The upper end of the chamber 38 is threaded as at 40. An open sided cage 42 having threads 44 at its upper end is threadably mounted in the casing 32. A seal 46 is secured to the cage 42 and engages a shoulder 48 adjacent the inlet end 34 of the casing 32 so as to form a seal between the cage 42 and casing 32. The cage 42 is provided with an inlet 50 which protrudes into the tank 10 to provide an air space when the valve is closed. The air space will permit normal expansion of the fluid in the tank without danger of fluid entering the vent line because of such expansion.

Mounted to the inlet end 50 of the cage 42 is a pair of U-shaped members 52 and 54. The members 52 and 54 may be wire or the like which are slightly biased inwardly so as to engage suitable apertures or the like formed in the inlet 50. The members 52 and 54 provide a substantially open cage within which is mounted a spherical float or ball 56. The float 56 will rise as the level of the fluid in tank 10 rises. When the float 56 reaches its uppermost extent of travel, it will seat against the valve surface 58 and prevent fluid from passing through the inlet 50. Suitable means, such as aperture 60 is provided on the side of inlet 50 to permit fumes or vapors to be vented from the tank 10 even though the float 56 is engaging the seat 58. In the filling of a gasoline tank from a tank truck or the like, when the float 56 seats itself on seat 58, a significant back pressure will be formed in the system and the operator filling the tank will know that the tank is substantially full. A handle 62 is secured to the upper end of the cage 42 to facilitate the turning of the cage 42 during insertion and removal of the cage.

An externally threaded cover 64 is threadably mounted to the casing 32 by the threads 40. A seal 66 is attached to the cover 64 to engage the casing 32 to provide an airtight seal. The seal 66 prevents any fumes or vapors from the tank 10 from entering the pipe area 16. A handle 68 is mounted to the cover 64 for ease in insertion and removal of the cover 64.

The pipe 16 is threaded at the upper and lower ends so as to threadably engage the casing 32 at 70. Attached to the upper end of pipe 16 is an internally threaded cover 72 having a suitable handle 74 attached thereto. The purpose of the cover 72 is to keep any contaminants, such as dirt and the like, from entering the pipe 16. A suitable cover 76 is mounted on the manhole 18.

In operation, the tank truck operator will attach the fill hose to the fill pipe 20 and commence filling of the respective storage tank. As the gasoline or fluid reaches the float 56, the float will rise upward in its cage according to the level of the fluid. When the float is in the position shown in FIG. 2, the fluid vapors and fumes will exit through the inlet 50 to the outlet port 36 to the vent 28. As the fluid in the tank rises and causes the float 56 to seat against surface 58, the vapor and fumes can only exit through the small aperture 60. This will cause a substantial back pressure to alert the truck operator that the tank is full.

Should it be necessary to examine or replace a part of the cage or float, the cover 76 is removed from the manhole 18. Next, the cover 72 is unscrewed from the pipe 16. A suitable wrench or the like is inserted into the pipe 16 to engage the handle 68 so that the cover 64 may be unscrewed and removed. The wrench or the like may then be again inserted into the pipe 16 to engage the handle 62 so that the cage 42, members 52, 54 and the float 56 may be removed from the casing 32. The members may be reinserted in the same manner.

In the illustrative embodiment described, aperture 60 provided a vapor vent when the float 56 was seated. It should be noted that other vents could be utilized. As an example, the surface 58 could have a vent groove or channel formed therein or the float 56 could be not truly spherical such that a poor seating results. The preferred embodiment is the aperture above the fluid level, such as aperture 60.

While the anti-contamination valve hereinabove described has been specifically described and shown for use with gasoline storage tanks, it can be seen that the vent valve may be used with any storage container where it is desired that vapors and fumes be vented therefrom while preventing the fluid from escaping during filling. The vent valve of this invention has only a single moving part and is foolproof in operation. Accordingly, it is seen that the objects hereinbefore set forth have been accomplished.

While a present exemplary embodiment of this invention has been illustrated and described, it will be recognized that this invention may be otherwise variously embodied and practiced by those skilled in the art.

What is claimed is:

1. An anti-contamination vent valve for tanks comprising in combination a casing detachably mounted to the top of the tank, said casing having an inlet port and an outlet port, the inlet port being in communication with the interior of the tank; an open cage mounted in said casing between said inlet port and said outlet port, said cage defining an inlet end smaller in diameter than said casing inlet port diameter to define a space therebetween and extending partially therethrough, said inlet end terminating in a seating surface; a float; a pair of U-shaped elements connected to the cage inlet end defining an open float supporting structure to support said float upstream of said seating surface wherein said float extends into the tank interior and is responsive to fluid level in the tank wherein vapors normally pass through said cage inlet end and whereby fluid is prevented from passing therethrough when said float is seated against said seating surface; a seal mounted on said cage to cooperatively engage the interior of said casing thereby forming a fluid seal between said cage and said casing and said cage inlet end having a continuously open aperture therethrough downstream of said seating surface, said aperture permitting communication between the tank and said casing outlet port through the space defined between said cage inlet end and said casing inlet port when said float is seated against said seating surface.

2. The valve according to claim 1 in which said casing has an opening opposite said inlet port to permit removal of said cage, one end of said cage being threadably formed to cooperatively engage the opening in said casing and thereby support said cage from said opening, and further comprising an externally threaded cover for mounting in the casing opening above said cage to seal the opening.

3. The valve according to claim 2 in which said cage and said cover each has a handle respectively mounted thereto for ease in insertion and removal of said cage and cover respectively from said casing opening.

4. The valve according to claim 3 in which said inlet end protrudes into the tank whereby an air space is defined above the level of the seating surface.

* * * * *